W. B. SMITH.
METAL BURNISHING MACHINE.
APPLICATION FILED JUNE 19, 1919.
1,401,563.
Patented Dec. 27, 1921.
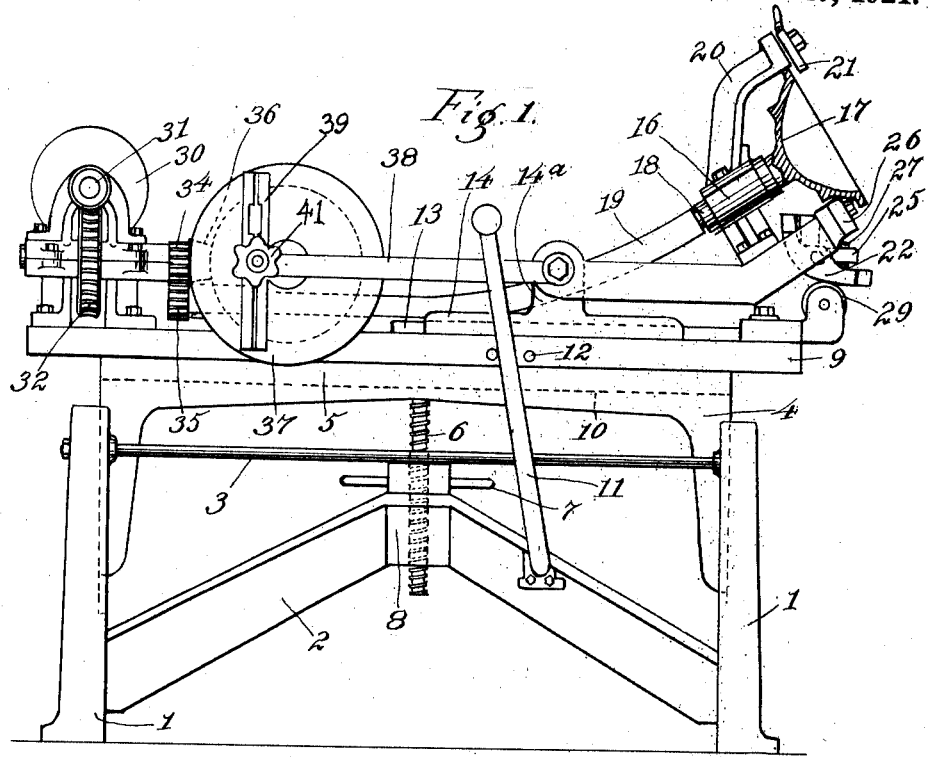
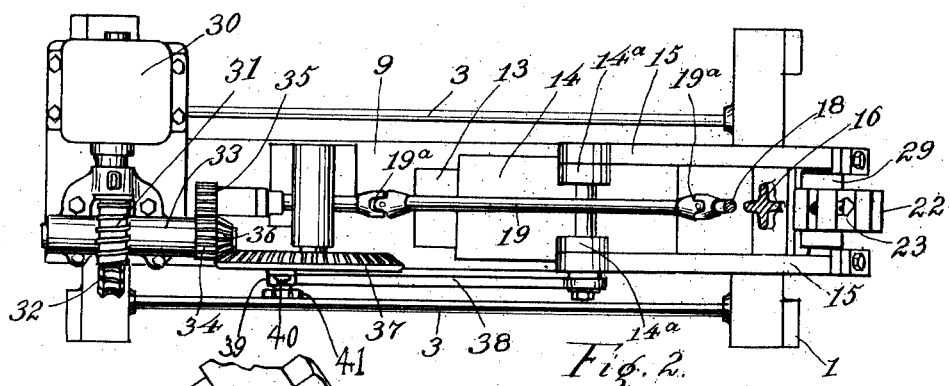
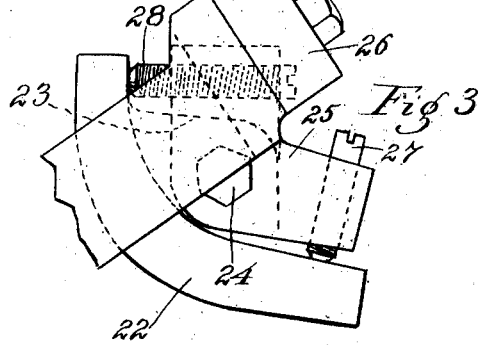
Inventor
William B. Smith
By Allen Allen
Attorneys

UNITED STATES PATENT OFFICE.

WILLIAM B. SMITH, OF NORWOOD, OHIO.

METAL-BURNISHING MACHINE.

1,401,563.

Specification of Letters Patent.  Patented Dec. 27, 1921.

Application filed June 19, 1919.  Serial No. 305,271.

*To all whom it may concern:*

Be it known that I, WILLIAM B. SMITH, a citizen of the United States, and a resident of the city of Norwood, in the county of Hamilton and State of Ohio, have invented certain new and useful Improvements in Metal-Burnishing Machines, of which the following is a full, clear, and exact description, reference being had to the drawings accompanying this specification.

My invention relates to a machine for retaining a concave or hollow piece of ware, of any character which is to be burnished, as by the passage of a revolving brush or the like over the inner surface of such hollow article. Among other articles which may be burnished on my machine, are the concave reflectors of automobile lamps, and the showing in the drawings is of a machine specially adapted for doing this work.

Among the objects of my invention are the provision of a holder for hollow ware, which will revolve it in contact with a burnishing tool, and at the same time impart to it a reciprocatory movement, so as to cause the burnishing brush or instrument to enter the article, and burnish it at the base as well as the sides. Another object is to provide a device of the above character which operates with a master member, that controls the reciprocatory movement of the holder portion of the machine, whereby a large variety of odd shapes of articles may be burnished on the same machine, by the insertion of a different master member.

Also I provide in my machine for the operation of the entire device from one source of power and provide for the easy withdrawal of the article holder without changing the adjustment of the bed of the machine with relation to the burnishing element.

I am aware that other burnishing machines have been devised which automatically burnish hollow articles, but in these machines so far as I am aware, the burnishing is done by flexible belts, which are a very large expense, since their life when in use is comparatively short. In my machine the object is to mechanically accomplish the motions which an operator would make if handling the article to be burnished so that the machine is capable of use with any usual burnishing wheel. The bed of the machine is made vertically adjustable in order to adjust the machine to whatever burnishing wheel it may be desired to use.

The above objects, and other advantages to be noted I accomplish by that certain construction and arrangement of parts to be hereinafter more specifically pointed out and claimed.

In the drawings,

Figure 1 is a side elevation of the machine.

Fig. 2 is a top plan view of a portion thereof.

Fig. 3 is a detail elevation of the master cam and its mounting.

The machine as shown in the example selected for illustration of the invention has the legs or standards 1, 1, joined together by a brace 2 and tie rods 3. The standards are dovetailed to provide grooves within which slide the pillars 4 of the bed 5 of the machine. The particular detail of this dovetailed groove on the standards and the dovetail on the pillars 4 has not been considered a necessary item for showing in the drawings.

A screw 6 which seats at its upper end in the bed of the machine is controlled by a hand wheel 7 suitably held in connection with the brace 2, said screw having its lower engagement in a threaded hole in the center 8 of the brace. This mechanism provides for vertical adjustment of the bed of the machine on the standards and enables the operator to set the machine for use with whatever height of burnishing tool he is required to employ.

The sliding table 9 of the machine, is slidably mounted lengthwise of the bed, in dovetails 10, and the whole table may be moved lengthwise of the bed by any desired operating handle such as the lever 11, pivoted to the machine base, and engaging between pins 12 on the table. This method of moving the table is intended as merely a simple one for illustrative purposes as is also the method shown of elevating the bed. Once the bed is properly positioned for height of the burnishing implement the movement of the table permits the work to be inserted and withdrawn from operative position without altering the position of the bed in any respect.

Mounted on track 13 on the table is a sliding plate 14 which carries the work holder and the master cam. The work holder itself is rotated by means preferably of a flexible shaft all as will be below described in detail.

On suitably journaled arms 15 on the standards 14ª of the plate 14, is mounted by means of a suitable journal 16, the work holder or chuck, 17. This chuck has a rigid rod 18 passing through the journal 16, and this rod is connected to a flexible shaft 19, which is driven during the operation of the machine. It is in the present drawing, shown as a chuck for holding the reflector of an automobile lamp, and in connection with it is shown retaining arm 20, which is secured on the upper side of the chuck journal, and has a finger 21 projecting over the mouth of the chuck to prevent a reflector from slipping away therefrom. If desired, the shaft 19 may be made of rigid material having two universal joints 19ª.

The master cam, which is to be shaped as required, for every particular piece or work, is in the adaptation selected for illustration a semi elliptical piece 22 swung by means of a central boss 23, on a pivot bolt 24. The pivot bolt is held in an angle piece 25, which is mounted by means of a plate 26 to the ends of the arms 15. Set screws 27 and 28 mounted in the angle piece, bear against the two ends of the cam, thereby adjusting its position.

Mounted at the end of the sliding table beneath the cam is a roller 29 on which the cam bears, thereby regulating the position of the chuck or work holder, since the arms 15 are journaled and the weight of the chuck and arms will keep the cam or master in abutment against the roller.

If it is desired to operate the machine by a separate motor, a motor 30 is provided suitably mounted on the table of the machine, the rotary shaft of the motor being provided with a worm 31 which meshes with a worm wheel 32. The worm wheel shaft 33, carries a gear 34, which meshes with another gear 35, journaled beneath it on the table. The gear 35 is connected to the flexible shaft which rotates the chuck.

The gear 34 has thereon a beveled pinion or gear 36 which meshes with a large beveled gear 37, also journaled on the table. This last gear carries a crank 38, which is connected to the shaft that mounts the arms 15 on the boss of the sliding plate. The operation of the gear 37 therefore, imparts reciprocatory motion to the sliding plate 14, which moves the chuck forward and back, thereby forcing the cam or master to ride over the roller, and thereby oscillating the chuck up and down. If desired, a dovetailed guide 39 may be mounted on the face of the gear 37, and the crank 38 will then have a pivotal mounting on a dovetail sliding block 40 in said guide. The block 40 is controlled by a screw 41, and permits control of the eccentricity of the crank 38, and thus of the reciprocal movement of the chuck.

It can be readily observed that the shape of the cam regulates the up and down movement of the chuck, and that any desired changed shape would impart any desired changed up and down motion.

Having then elevated the bed of the machine to the height of the burnishing implement, usually a rotating brush, and having positioned the standards a sufficient distance away from the tool so that the most forward position of the chuck will just bring the brush or other implement to the base of the reflector or other articles that is to be buffed, or burnished, the operator has but to provide the proper master cam for any desired type of work, and thereafter has but to insert and withdraw the articles to be buffed. To do this he pulls over the table controlling lever to withdraw the chuck from the burnishing implement, removes the finished article and inserts another, thereafter thrusting the controlling lever forward to the limit of its movement. Any sort of stop 38, will serve to limit the forward movement of this controlling lever.

It is not desired because of failure to mention equivalent structure in the above description to limit the scope of my invention to the precise structure shown and described. There is a wide variety of uses to which my machine may be put, and I do not wish to be limited to the use described herein. For example with a concave cam, a convex piece of work can be buffed or burnished or lateral cam could be used to give a lateral instead of an up and down oscillation.

Having thus described my invention what I claim as new and desire to secure by Letters Patent is:—

1. In a machine for buffing or the like, the combination with a work holder, of automatic means to impart reciprocatory motion thereto, automatic means to enforce curvilinear motion thereto and automatic means for imparting rotary motion thereto, all of said motions being simultaneous.

2. In a machine of the character described the combination with a work holder of means to impart reciprocatory motion thereto, and a master element to enforce a desired curvilinear motion thereto simultaneously to the reciprocatory motion.

3. In a machine of the character described, the combination with a reciprocated member, of a work holder journaled thereto, and a master member comprising a rest for the work holder, whereby the movement of said reciprocated member will impart a combined oscillatory and reciprocatory motion.

4. In a machine of the character described the combination with a work holder or means to impart reciprocatory motion thereto, and a master element to enforce a desired curvilinear motion thereto simultaneously to the reciprocatory motion, and means for simultaneously rotating said work holder.

5. In a machine of the character described the combination with a slidable table, of a source of power mounted thereon, a rotary element operated from said motor, and a reciprocated element operated also from said motor, of a work holder simultaneously acted upon by said two elements, and means for movably mounting the work holder on the reciprocated element, so as to permit of an oscillatory movement of the same thereon.

6. In a machine of the character described, a work holder and automatic means for simultaneously rotating, reciprocating and vertically oscillating the same, to enforce a curvilinear path.

7. In a machine of the character described a work holder and means for simultaneously and automatically rotating, reciprocating and vertically oscillating the same so as to enforce a curvilinear path, a standard for said machine, and slidable means on said standard for mounting the work holder and its operating means.

8. In a machine of the character described, the combination with a revoluble holder for an article to be treated, of a pivotal arm device for mounting said holder, means for reciprocating the same, and a master element to provide a resting point for the holder and over which the holder moves in its reciprocating path, whereby the face of said master element controls the line of motion of the work holder.

9. In a machine of the character described, the combination with a work holder, of means to impart reciprocatory motion thereto, and a master element to enforce a desired curvilinear motion thereto simultaneously to the reciprocatory motion, and means for adjusting the reciprocal movement of the holder for length of movement.

10. In a machine of the character described, the combination with a work holder, of means to impart reciprocatory motion thereto, and a master element to enforce a desired curvilinear motion thereto simultaneously to the reciprocatory motion, and a table for all of the above named parts, said table being movably mounted to permit of moving all of said parts toward and away from a point of work.

11. In a machine of the character described, the combination of a support, a motor on the support, a slidable member operated by said motor, a revoluble work holder movably mounted on the slidable member and operated by said motor, and means for imparting rectilinear motion to said holder in addition to the movement imparted by the slidable member whereby a curvilinear path is enforced, for the purpose described.

12. In a machine of the character described, the combination with a work holder, of means to impart reciprocatory motion thereto, and a master element to enforce a desired curvilinear motion thereto simultaneously to the reciprocatory motion, and means for adjusting the position of said master member to vary said line of motion.

WILLIAM B. SMITH.